No. 609,549. Patented Aug. 23, 1898.
W. KAULHAUSEN.
MACHINE FOR SCARF JOINTING LEATHER.
(Application filed Feb. 3, 1896. Renewed Nov. 1, 1897.)
(No Model.) 4 Sheets—Sheet 1.
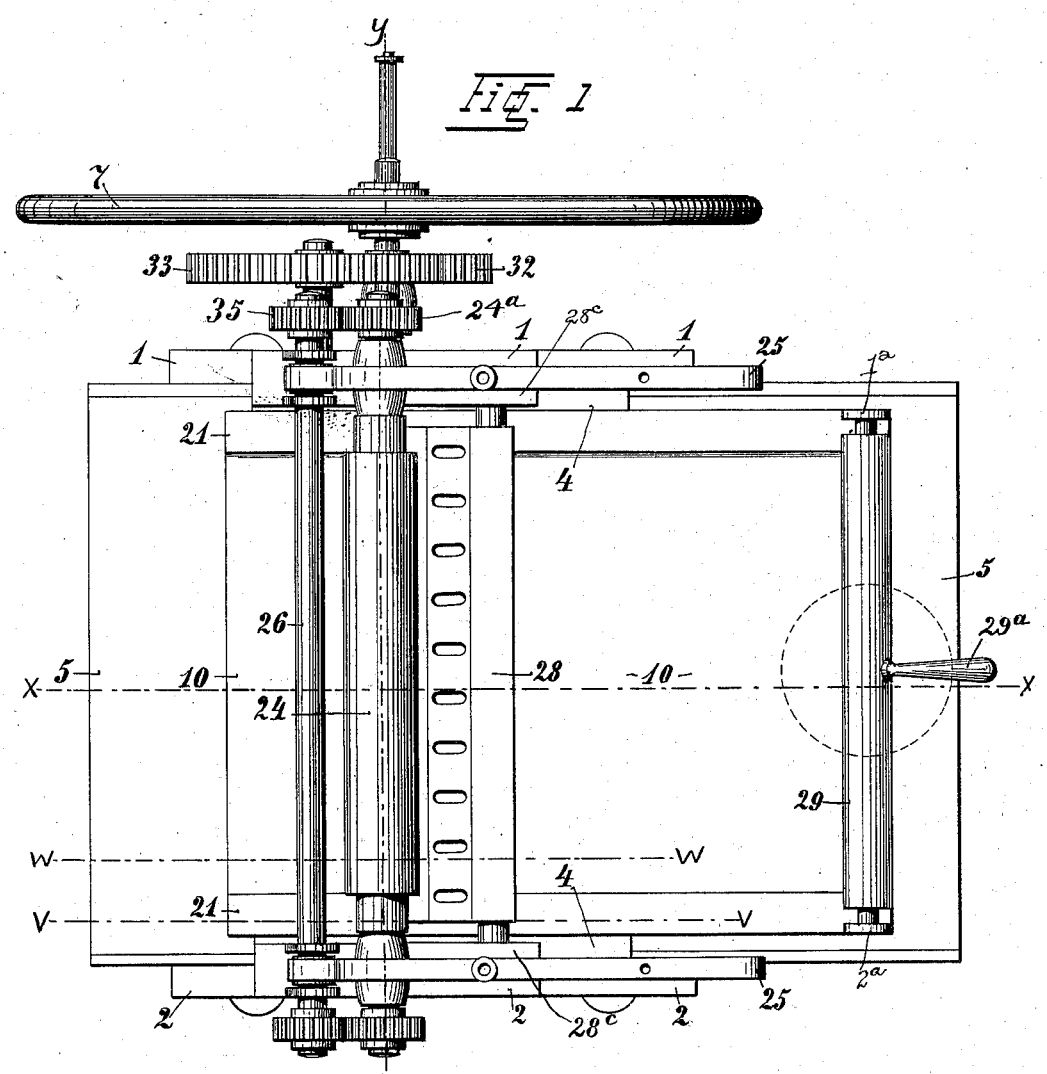
Witnesses:
Inventor:
Wilhelm Kaulhausen
by O. B. Reichelt
Attorney.

No. 609,549. Patented Aug. 23, 1898.
W. KAULHAUSEN.
MACHINE FOR SCARF JOINTING LEATHER.
(Application filed Feb. 3, 1896. Renewed Nov. 1, 1897.)
(No Model.) 4 Sheets—Sheet 2.
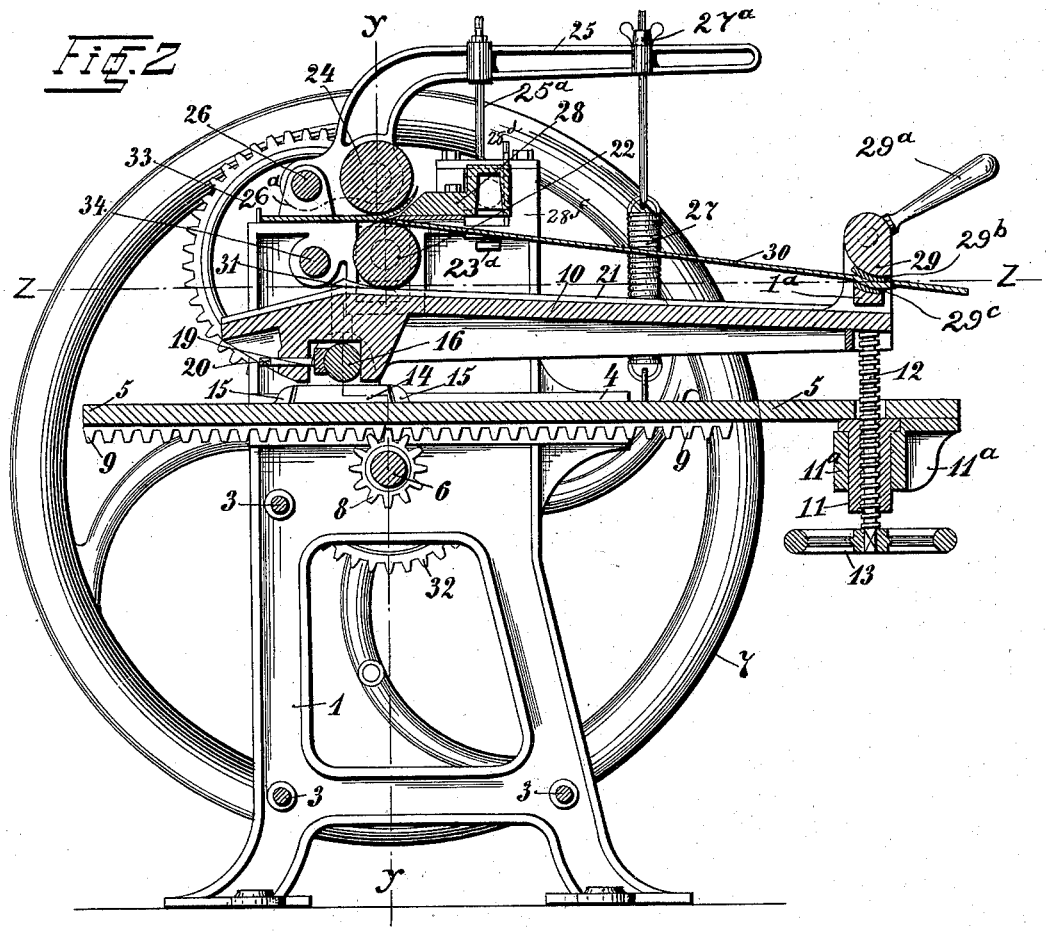
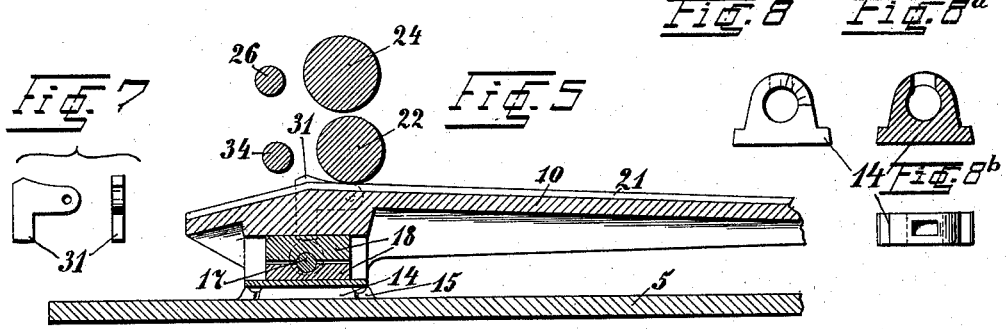
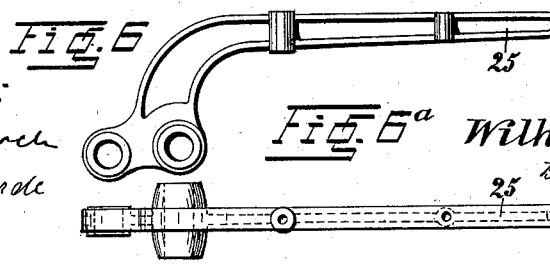
Witnesses: Inventor:
Wilhelm Kaulhausen
Attorney.

No. 609,549. Patented Aug. 23, 1898.
W. KAULHAUSEN.
MACHINE FOR SCARF JOINTING LEATHER.
(Application filed Feb. 3, 1896. Renewed Nov. 1, 1897.)
(No Model.) 4 Sheets—Sheet 3.
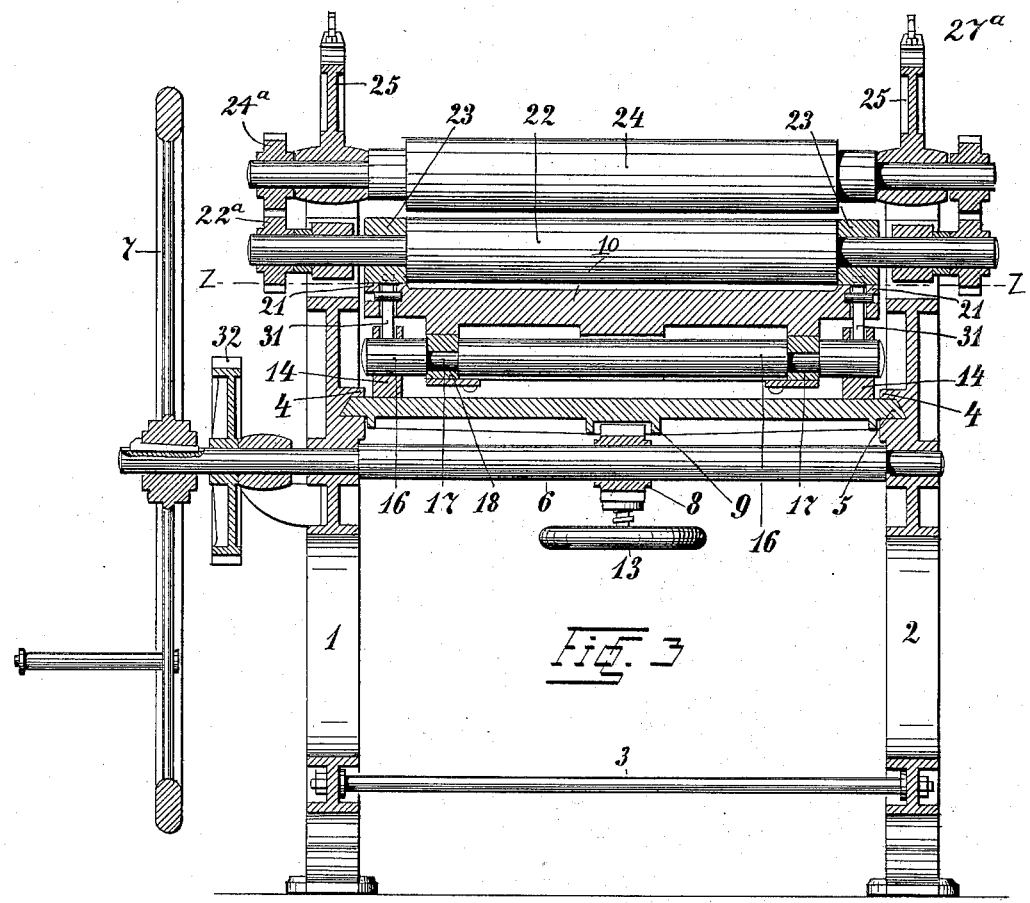
Fig. 3
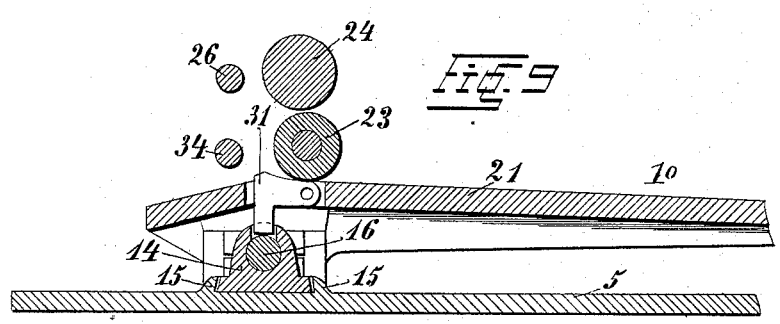
Fig. 9
Fig. 10
Witnesses: 
Max Frambach
Hermann Herde
Inventor:
W. Kaulhausen
by O. B. Reichelt
Attorney.

No. 609,549. Patented Aug. 23, 1898.
W. KAULHAUSEN.
MACHINE FOR SCARF JOINTING LEATHER.
(Application filed Feb. 3, 1896. Renewed Nov. 1, 1897.)
(No Model.) 4 Sheets—Sheet 4.
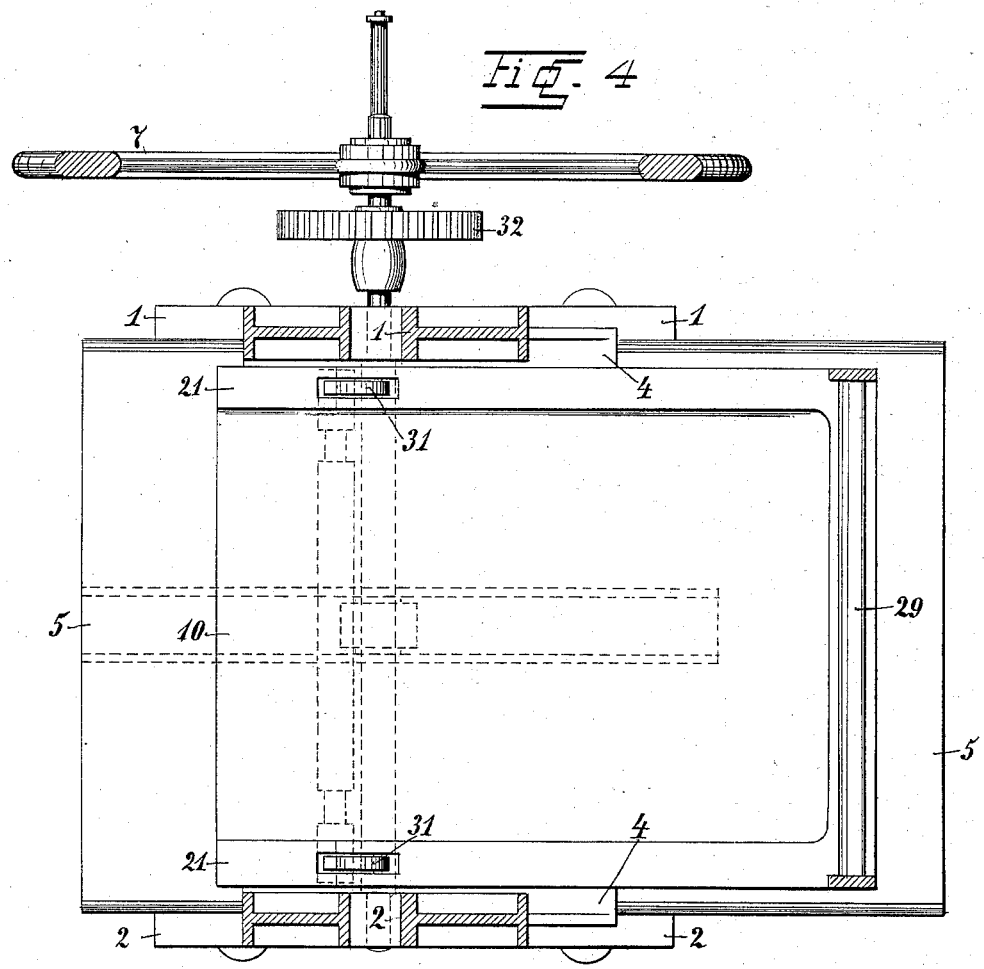
Witnesses:
Max Frambach
Hermann Hude
Inventor:
Wilhelm Kaulhausen
by O. B. Raichelt
Attorney.

United States Patent Office.

WILHELM KAULHAUSEN, OF AACHEN, GERMANY.

MACHINE FOR SCARF-JOINTING LEATHER.

SPECIFICATION forming part of Letters Patent No. 609,549, dated August 23, 1898.

Application filed February 3, 1896. Renewed November 1, 1897. Serial No. 657,080. (No model.) Patented in England November 29, 1895, No. 22,875.

*To all whom it may concern:*

Be it known that I, WILHELM KAULHAUSEN, engineer, a citizen of the Kingdom of Prussia, and a resident of Aachen, in the Kingdom of Prussia and German Empire, have invented certain new and useful Improvements in Machines for Scarf-Jointing Leather, (for which I have secured a patent in England, dated November 29, 1895, No. 22,875,) of which the following is a specification.

My invention relates to an improved machine for shaving or skiving strips or belts of leather and like material, and is especially used for dressing the adjacent overlying ends of belts of such material which are to be joined together to avoid a ridge or to unite the ends with a thickness even with that of the unspliced or body portion of the material.

My invention consists in certain mechanical details of construction and combinations of parts, hereinafter particularly described, which will provide a strong, simple, and effective machine which may be accurately adjusted and which will handle either heavy or light material of any grade, width, or thickness with equal and unvaried precision in operation, as will hereinafter appear.

In the accompanying drawings, which illustrate my invention, Figure 1 is a plan view of my invention; Fig. 2, a vertical longitudinal section thereof in line $x\ x$ of Fig. 1; Fig. 3, a vertical transverse section in line $y\ y$ of Figs. 1 and 2; Fig. 4, a horizontal section in line $z\ z$ of Figs. 2 and 3; Fig. 5, a vertical longitudinal sectional view of the inclined table in line $w\ w$ of Fig. 1 and some of the rollers and parts connected with and operated thereby; Fig. 6, an elevation, and Fig. $6^a$ a plan, of the lever for supporting the pressing-roller; Fig. 7, a face and edge view, respectively, of the nose-plate in detail, which also lifts the cutting-roll to round off the edge of the leather. Figs. 8, $8^a$, and $8^b$ are respectively a side elevation, a vertical section, and a plan of a bearing-block of special construction; Fig. 9, a vertical longitudinal sectional view of the inclined table in line $v\ v$ of Fig. 1, showing the nose-plate and bearing-block illustrated in Figs. 7 and 8; Fig. 10, detail views, in end elevation, sectional side elevation, and transverse section, successively, of the eccentric journal adjusting axle; Fig. 11, a vertical transverse section in line $t\ t$ of Fig. 12; Fig. 12, a vertical longitudinal side elevation; and Fig. 13, an end elevation of the knife-bar and the blade adjustable thereon, as will hereinafter appear.

The general construction and operation of my machine are as follows:

A table having an adjustable inclined bed is reciprocated by means of a tooth-bar and a gear-pinion engaging therewith and is brought in contact with a roller capable of displacement only in a vertical direction to and from the cutting edge of a knife held above said roller. A strap of leather is placed upon the bed of the table, clamped at one end thereof, led between the aforesaid knife and roller and pressed down by a roller arranged above the first-named roller, as shown clearly in Fig. 1 of the drawings, and in such manner that when the table is moved lengthwise by a crank-pinion and rack the strap is moved, together with the table, and is beveled off corresponding to the inclination of the table, as the roller bearing the strap rises on the rails of the inclined table and the knife remains stationary. The vertically-moving roller is finally elevated by novel means to cut off the extreme end or edge of the leather in a curved or rounded form.

The frame consists of two side pieces 1 and 2, connected by stay-rods 3 and provided each with guide-flanges 4 on their inner faces to receive the side edges of a movable table 5, which freely slides therein. A shaft 6, carrying a fly-wheel and crank 7 at one end thereof and a gear-pinion 8, secured thereto at the middle thereof to engage with a rack 9, arranged longitudinally at the middle and secured to the under side of the table 5 to move the latter longitudinally in its bearings by the rotation of said shaft and gear-pinion.

An adjustable table 10 is supported upon and connected with the table 5 to move therewith and be adjusted thereon both to suit the thickness of the material to be operated upon and also to regulate the longitudinal angular movement of the table relatively to the knife. A screw-nut 11, secured to a bracket 11ª, bolted to the under side and feed end of the table 5, receives an adjusting-screw 12, provided with a hand-wheel 13 at the lower end thereof and adapted to press against the corresponding free end of the adjustable table 10 to raise and lower it angularly. The table 5 supports bearing-blocks 14 at either side thereof, fitted into lugs 15 thereon and carrying a shaft 16, provided at two places with grooves forming eccentric wrists 17, which latter support bearings 18, cast upon or secured to the under side of the adjustable table 10 at the end of the table opposite that which is adjusted by means of the screw 12, thus providing for the upper table 10 a secure connection with the lower table 5 and a bearing at one end to firmly hold the table, while the extreme opposite end is capable of a very small and accurate adjustable movement and inclination of the upper table by means of the screw 12, as will hereinafter appear. A further adjustment of the upper table to adapt it to the thickness of the material to be operated upon is effected by the rotation of shaft 16 in the bearings 14 to bring the eccentric wrists 17 at a higher or lower elevation relatively thereto by means of a key fitted in the squared hole in one end of said shaft 16, the said shaft being then secured in its adjusted position by means of a bearing-block 19 and pressure-screw 20, bearing thereon, as clearly shown in Fig. 2.

The adjustable table 10 has at each side an elevated rail 21, on which rest the bearings 23 of the vertically-moving knife-roller 22, the said bearings being so held within housings in the side frame-plates 1 and 2 as to be capable of moving only in a vertical plane to lift the material gradually to the knife as the inclined rails of the table move longitudinally. A pressing-roller 24, resting upon the material directly above the knife-roller 22, is supported upon levers 25 and is pressed downwardly thereby. The lever 25 is supported and swings vertically upon a shaft 26, carried by lugs 26ª on the side pieces 1 and 2 of the frame, and is guided by a rod 25ª, also affixed to the frame and held down with an elastic pressure by a tension-spring 27, connected by links at its opposite ends respectively with the frame and with the free end of lever 25, a screw-nut 27ª at the upper end of the spring-rod serving to adjust the tension of the said spring upon the lever.

A knife-block 28 carries a blade 28ª, adjustable thereon in any well-known manner, and has end journals 28ᵇ, which fit in bearing-blocks 28ᶜ and are adjusted by a screw 28ᵈ in pillow-blocks 28ᶠ in the side plates 1 and 2 of the frame.

A clamp-block 29, operated by a hand-lever 29ª and arranged opposite clamping-plates 29ᵇ 29ᶜ, respectively, is supported upon uprights 1ª 2ª at the end of the upper table 10 to clamp the leather belt 30 and hold it securely while it is carried forward to the knife by the longitudinal movement of the tables 5 10 and by the rotation of the rollers 22 and 24, between which the leather belt is drawn. The inclination of the table, which moves beneath the knife-roller 22 as the belt is drawn forward to the knife, lifts said roller gradually to the knife and against the pressure of the presser-roller 24 and skives or cuts off the leather obliquely, the extreme edge of the leather being rounded off by a more abrupt elevation of the knife-roller 22 by means of a nose-plate 31, which is fitted in the slotted cap of the bearing-block 14, as clearly shown in Figs. 7, 7ª, 8ª, and 8ᵇ of the drawings, and presses beneath said roller as the table 5, to which said bearing-block 14 is secured, is moved forward. The rotation of the knife-roller 22 and the pressing-roller 24 is effected by a gear-wheel 32 of the driving-shaft 6, which drives a larger toothed wheel 33 on a shaft 34, supported in bearings in the side pieces 1 and 2 of the frame and carrying a pinion which gears with a pinion on the knife-roller 22, a similar pinion on the pressing-roller 24 serving to rotate said rollers 22 and 24 positively and at a uniform speed, although any system of intermediate gears may be employed to connect the driving-shaft with said roller, which may be readily suggested by a mechanic and need not be illustrated in detail in the drawings.

The operation of the machine will be readily understood from the foregoing description. The leather belt 30 is placed in the machine by turning the handle 29ª and lever 25 to the left, as shown in Fig. 1, and by lifting up the edge of the knife-block 28 on its journals 28ᵇ the said levers and knife when returned to their positions shown in said Fig. 1 serve to hold the leather belt securely in position after it has been properly placed between them.

I claim as my invention and desire to secure by Letters Patent—

1. In a machine for shaving and skiving leather, the combination with the frame, of the reciprocating table, the knife, the vertically-movable knife-roller, the pressing-roller and levers carrying the journals of said pressing-roller journaled to the frame, and a spring-coil connecting adjustably the frame with the free end of said lever, substantially as described.

2. In a machine for shaving and skiving leather, the combination with the frame, of the reciprocating table, the vertically-moving knife-roller, the pressing-roller supported in bearings in spring-actuated levers journaled to the frame, and a knife secured to a block journaled at its ends in the frame to be moved into and out of working distance from the knife-roller, substantially as described.

3. In a machine for shaving and skiving leather, the combination with the frame, of the adjustable knife-roller, the pressing-roller, the knife, the table made in two sections, one journaled to and adjustable on the other, and a nose-plate fixed to the journal-bearings of said tables to lift the adjustable knife-roller, substantially as described.

In testimony that I claim the foregoing as my invention I have signed my name in the presence of two subscribing witnesses.

WILHELM KAULHAUSEN.

Witnesses:
   JOHN HECKMANNS,
   W. C. EMMET.